(12) United States Patent
Zander et al.

(10) Patent No.: US 6,298,201 B1
(45) Date of Patent: Oct. 2, 2001

(54) EXPOSURE COUNT INDICATOR

(75) Inventors: Dennis R. Zander, Penfield; Francis R. Skop, Jr., Rochester, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/521,710

(22) Filed: Mar. 9, 2000

(51) Int. Cl.[7] .................................................. G03B 17/36
(52) U.S. Cl. ............................................................. 396/284
(58) Field of Search .................................... 396/284, 285, 396/515; 235/91 C

(56) References Cited

U.S. PATENT DOCUMENTS

| | | |
|---|---|---|
| 1,294,433 | 2/1919 | Evers . |
| 2,917,981 | 12/1959 | Sewig . |
| 5,153,627 | 10/1992 | Dwyer . |
| 6,007,260 | * 12/1999 | Moseley et al. ............... 396/515 |

* cited by examiner

Primary Examiner—Alan A. Mathews
(74) Attorney, Agent, or Firm—Roger A. Fields

(57) ABSTRACT

An exposure count indicator includes a flexible split ring having a series of exposure count indicia provided along the split ring, and a mask that covers the split ring to prevent the exposure count indicia from being seen. When the split ring is rotated relative to the mask, the split ring is advanced through a ring egress opening in the mask to progressively relocate the split ring from being beneath one side of the mask to being above another side of the mask to allow the exposure count indicia to be progressively seen. Thus, the split ring becomes increasingly present at one side of the mask and decreasingly present at the other side of the mask as the exposure count indicia can be increasingly seen.

10 Claims, 2 Drawing Sheets

EXPOSURE COUNT INDICATOR

FIELD OF THE INVENTION

The invention relates generally to the field of photography, and in particular to an exposure count indicator preferably for a camera.

BACKGROUND OF THE INVENTION

Practically every camera that is available today includes an exposure count indicator. Typically, the exposure count indicator provides a visible indication of the number of film frames that remain available to be exposed on a filmstrip in the camera, i.e. the current number of exposures that can be made on the filmstrip. Conversely, the exposure count indicator can provide a visible indication of the number of film frames actually exposed on the filmstrip, i.e. the number of exposures actually made. In either case, the exposure count indicator includes a numerical scale (series) of successive exposure count indicia that are evenly spaced from one another. The scale of indicia at least range from the number "1" which indicates either that only one frame remains available to be exposed on the filmstrip, or only one frame has been actually exposed, to a higher number which is the maximum number of exposures, for example "15", "24" or "40" available on the filmstrip.

PRIOR ART PROBLEM

Typically, one can only look to the visible indication of the number of film frames that remain available to be exposed on a filmstrip in the camera, i.e. the current number of exposures that can be made on the filmstrip, or conversely, the visible indication of the number of film frames actually exposed on the filmstrip, i.e. the number of exposures actually made. No further indication is provided that gives one a sense of the incrementally-increasing exposed length of the filmstrip each time an exposure is made in the camera.

SUMMARY OF THE INVENTION

A method of operating an exposure count indicator comprising:
rotating a flexible split ring or a mask relative to the other to direct the split ring through an indicia viewing opening in the mask, both to cause a series of exposure count indicia provided along the split ring to be successively shown at the indicia viewing opening and to progressively relocate the split ring from being adjacent one side of the mask to being adjacent another side of the mask, whereby the split ring becomes increasingly present at one side of the mask and decreasingly present at the other side of the mask as the exposure count indicia can be successively seen at the indicia viewing opening.

An exposure count indicator comprising:
a flexible split ring including a scale of exposure count indicia provided along the split ring;
a mask having a pair of opposite sides one of which covers the split ring to prevent the exposure count indicia from being seen, and having an indicia viewing opening with a ramped exit portion that directs the split ring through the indicia viewing opening both to progressively relocate the split ring from being adjacent one of the sides of the mask to being adjacent the other side of the mask and to cause the exposure count indicia to be successively shown at the indicia viewing opening when there is relative rotation between the split ring and the mask; and
a rotator for rotating one of the split ring and the mask relative to the other, whereby the split ring becomes increasingly present at one of the sides of the mask and decreasingly present at the other side of the mask as the exposure count indicia can be successively seen at the indicia viewing opening.

DETAILED DESCRIPTION OF THE INVENTION

Figure 1:
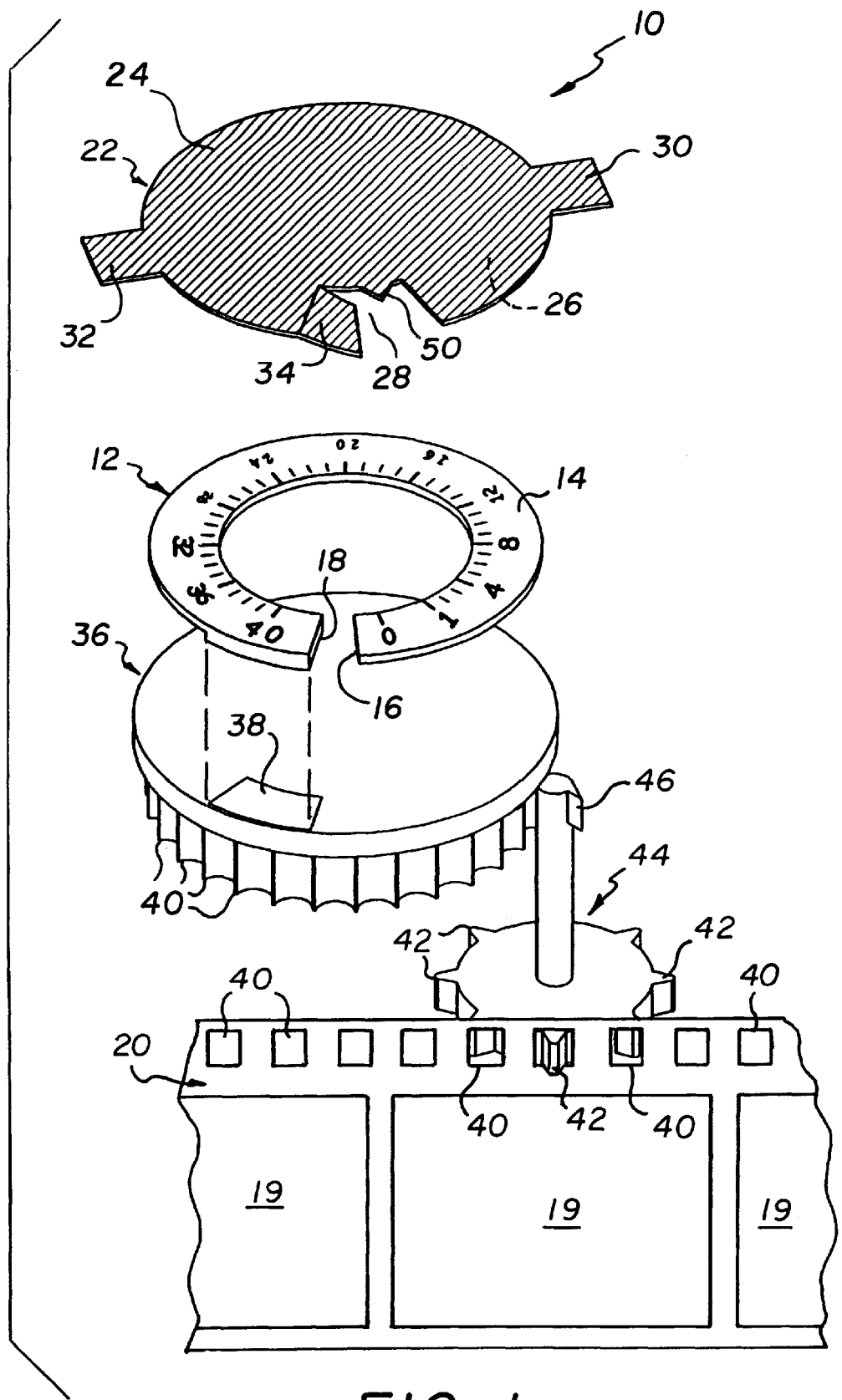
FIG. 1 is an exploded perspective view of an exposure count indicator according to a preferred embodiment of the invention.

The invention is disclosed as being embodied preferably in an exposure count indicator 10 used in a camera (not shown). See FIGS. 1–3. Because the features of a camera are generally known, the description which follows is directed in particular only to those elements forming part of or cooperating directly with the disclosed embodiment. It is to be understood, however, that other elements may take various forms known to a person of ordinary skill in the art.

The exposure count indicator 10 comprises a flexible split ring 12 including a scale (series) of exposure count indicia 14 provided along the split ring between a leading end portion 16 and a trailing end portion 18 of the split ring for visually indicating which film frame 19 of a known filmstrip 20 is positioned for exposure in a camera. See FIG. 1. The exposure count indicia 14 can be the numbers "0", "1", "2",–"40", for example.

Figure 2:
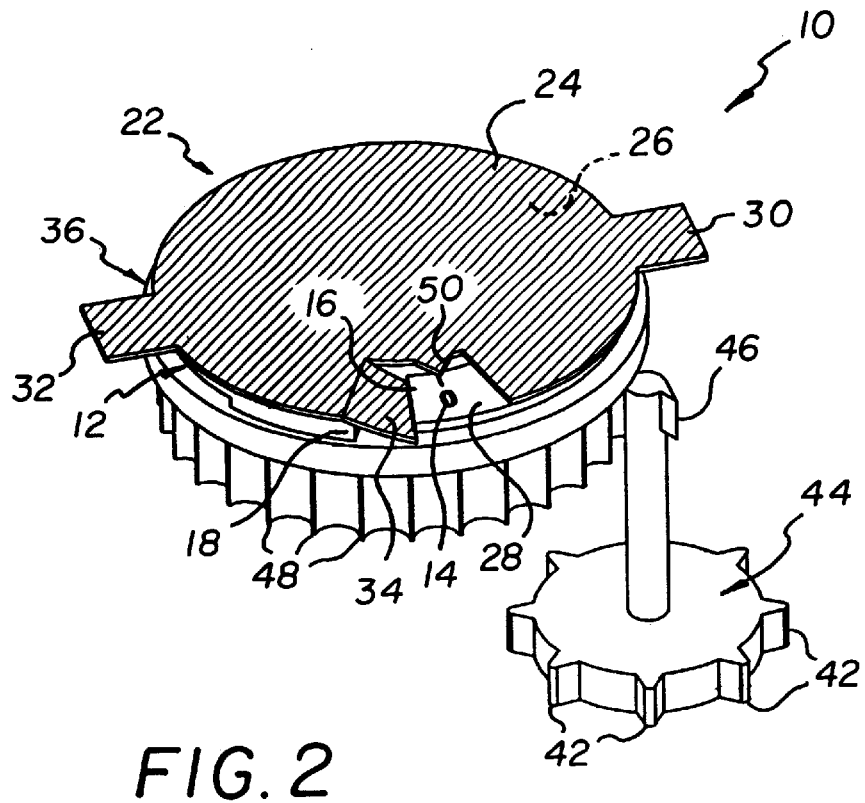
FIGS. 2 and 3 are assembled perspective views of the exposure count indicator illustrating its operation.

A stationary opaque mask 22 has a pair of opposite flat top and bottom sides 24 and 26. As shown in FIG. 2, the bottom side 26 of the mask 22 intimately covers the split ring 12 to prevent the exposure count indicia 14 "1"–"40" initially from being seen. The first one of the exposure count indicia 14 "0" can be seen at an indicia viewing/ring egress opening 28 in the mask 22, in FIG. 2. To make the mask 22 stationary, it can secured at an integral pair of opposite fixed tabs 30 and 32. The mask 22 has a ramped (inclined) exit portion 34 at the indicia viewing/ring egress opening 28 that serves to direct the split ring 12, beginning with the leading end portion 16 of the split ring, through the opening when the split ring is rotated clockwise in FIG. 3 relative to the mask. As the split ring 12 progressively emerges from the opening 28, the exposure count indicia 14 "1"–"40" are successively temporarily located at the opening.

The trailing end portion 18 of the split ring 12 is secured to a rotatable disk support 36 via an adhesive pad 38, to make the split ring 12 uniformly rotate with the support. A known rotatable sprocket wheel 44 having respective similar pitch teeth 42 for engaging substantially identical pitch perforations 40 in the filmstrip 20 is rotated via film advancing movement, to rotate a coaxial picker 46 in engagement with respective peripheral teeth 48 of the support to rotate the support and consequently the split ring 12.

Operation

A method of operating the exposure count indicator 10 is as follows.

Figure 3:
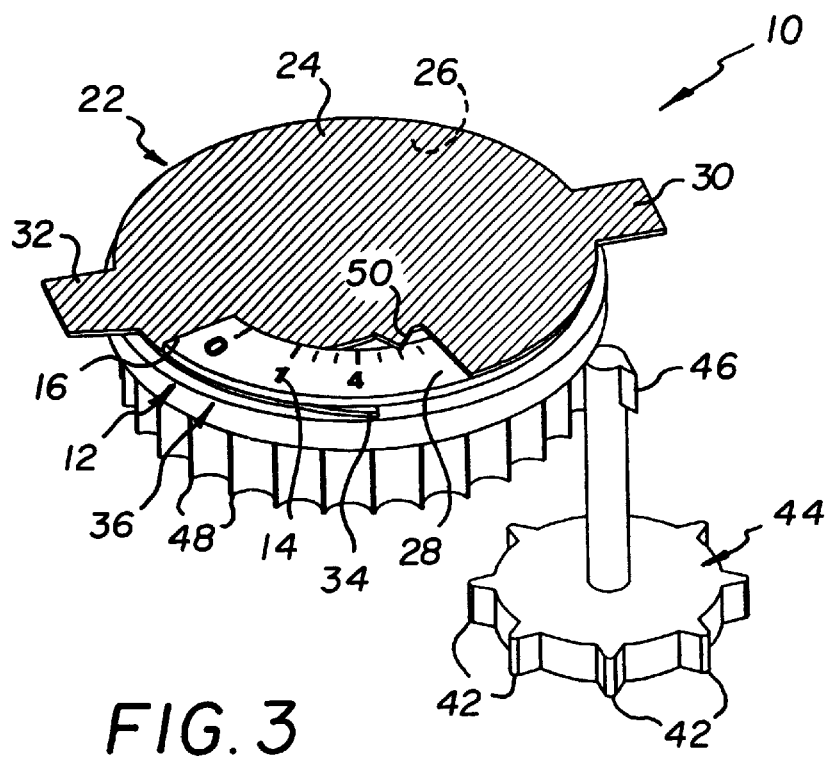

Each time the filmstrip 20 is advanced a single frame increment to the right in FIG. 1, the sprocket wheel 44 and the coaxial picker 46 are correspondingly rotated counterclockwise in FIG. 3 due to engagement of one of the teeth 42 of the sprocket wheel with one of the perforations 44 in the filmstrip. The picker 46, in turn, rotates the support 36 and the split ring 12 clockwise in FIG. 3 due to engagement of the picker with one of the teeth 48 of the support.

Since the split ring 12 is rotated clockwise in FIG. 3 relative to the mask 22, the ramped exit portion 34 of the mask directs the split ring beginning with its leading end portion 16 through the indicia viewing/ring egress opening 28 both to progressively relocate the split ring from being adjacent (beneath) the bottom side 26 of the mask 22 to being adjacent (above) the top side 24 of the mask and to cause the exposure count indicia 14 "1"–"40" to be successively shown at the opening. The mask 22 has a pointer 50 positioned to point to any one of the exposure count indicia 14 at the opening 28.

Thus, the split ring 12 becomes increasingly present above the top side 24 of the mask and decreasingly present below the bottom side 26 of the mask as the exposure count indicia 14 "1"–"40" can be successively seen at the indicia viewing/ring egress opening 28 (and can be increasingly seen above the top side).

The invention has been described with reference to a preferred embodiment. However, it will be appreciated that variations and modifications 20 can be effected by a person of ordinary skill in the art without departing from the scope of the invention. For example, instead of the split ring 12 being rotated clockwise in FIG. 3 relative to the mask 22, the mask can be rotated counter-clockwise relative to the split ring to achieve the same result. The indicia viewing/ring egress opening 28 can be narrowed in width to be slit-like in order to serve only as a ring egress opening, and the pointer 50 instead of being positioned at the opening can be positioned beyond the opening to point to the exposure count indicia 14 "1"–"40" as they individually emerge from the opening.

PARTS LIST 10. exposure count indicator
12. split ring
14. scale (series) of exposure count indicia
16. leading end portion
18. trailing end portion
19. film frame
20. filmstrip
22. mask
24. top side
26. bottom side
28. indicia viewing/ring egress opening
30. tab
32. tab
34. ramped exit portion
36. support
38. adhesive pad
40. film perforations
42. teeth
44. sprocket wheel
46. picker
48. teeth
50. pointer

What is claimed is:

1. A method of operating an exposure count indicator comprising:

rotating a flexible split ring or a mask relative to the other to direct the split ring through an indicia viewing opening in the mask, both to cause a series of exposure count indicia provided along the split ring to be successively shown at the indicia viewing opening and to progressively relocate the split ring from being adjacent one side of the mask to being adjacent another side of the mask, whereby the split ring becomes increasingly present at one side of the mask and decreasingly present at the other side of the mask as the exposure count indicia can be successively seen at the indicia viewing opening.

2. An exposure count indicator comprising:

a flexible split ring including a scale of exposure count indicia provided along said split ring;

a mask having a pair of opposite sides one of which covers said split ring to prevent said exposure count indicia from being seen, and having an indicia viewing opening with a ramped exit portion that directs said split ring through said indicia viewing opening both to progressively relocate said split ring from being adjacent one of said sides of said mask to being adjacent the other side of said mask and to cause said exposure count indicia to be successively shown at said indicia viewing opening when there is relative rotation between said split ring and said mask; and a rotator for rotating one of said split ring and said mask relative to the other, whereby said split ring becomes increasingly present at one of said sides of said mask and decreasingly present at said other side of the mask as said exposure count indicia can be successively seen at said indicia viewing opening.

3. An exposure count indicator as recited in claim 2, wherein a pointer is positioned to point to any one of said exposure count indicia at said indicia viewing opening.

4. An exposure count indicator comprising:

a rotatable flexible split ring including a scale of exposure count indicia provided along said split ring; and a mask having a pair of opposite sides one of which covers said split ring to prevent said exposure count indicia from being seen, and an indicia viewing opening with a ramped exit portion that directs said split ring when rotated relative to said mask to progressively move through said indicia viewing opening from one of said sides of said mask to the other side of said mask to successively locate said exposure count indicia at said indicia viewing opening, whereby said exposure count indicia can be successively seen at said indicia viewing opening as said split ring is progressively changed from being at one of said sides of said mask to said other side of said mask.

5. A method of operating an exposure count indicator that includes a flexible split ring having a series of exposure count indicia provided along the split ring, and a mask that covers the split ring to prevent the exposure count indicia from being seen, said method comprising:

rotating the split ring relative to the mask to advance the split ring through a ring egress opening in the mask, to progressively relocate the split ring from being beneath one side of the mask to being above another side of the mask to allow the exposure count indicia to be progressively seen, whereby the split ring becomes increasingly present at one side of the mask and decreasingly present at the other side of the mask as the exposure count indicia can be increasingly seen.

6. An exposure count indicator comprising:

a rotatable flexible split ring having a leading end portion and a trailing end portion, and including a scale of exposure count indicia provided between said leading and trailing end portions; and a mask that covers said split ring to prevent said exposure count indicia from being seen, and has a ring egress opening with a ramped exit portion that directs said split ring to progressively emerge from said egress opening beginning with said leading end portion when said split ring is rotated relative to said mask, whereby said exposure count indicia can be increasingly seen as said split ring progressively emerges from said egress opening.

7. An exposure count indicator as recited in claim 6, wherein said mask includes a pointer positioned to point to any one of said exposure count indicia that can be seen.

8. An exposure count indicator for a camera, comprising:

a rotatable support;

a flexible split ring that is secured to said rotatable support only along a trailing end portion of said split ring, and including a scale of exposure count indicia provided between a leading end portion of said split ring and said trailing end potion for visually indicating which frame of a filmstrip is positioned for exposure in the camera; and a stationary mask that covers said split ring to prevent said exposure count indicia from being seen, and has a ring egress opening with a ramped exit portion that directs said split ring to progressively emerge from said egress opening beginning with said leading end portion when said support is rotated relative to said mask to similarly rotate said split ring, whereby said exposure count indicia can be increasingly seen as said split ring progressively emerges from said egress opening.

9. An exposure count indicator as recited in claim 8, wherein said mask is opaque.

10. An exposure count indicator as recited in claim 8, wherein a sprocket wheel having respective teeth for engaging perforations in a filmstrip is rotated in rotational coupling with said support to rotate said support.

* * * * *